United States Patent [19]

McCray et al.

[11] 4,204,787
[45] May 27, 1980

[54] MILLING CUTTER

[75] Inventors: David M. McCray, Latrobe, Pa.; Gerald D. Murray, Concord, Ohio

[73] Assignee: Kennametal Inc., Latrobe, Pa.

[21] Appl. No.: 935,087

[22] Filed: Aug. 21, 1978

[51] Int. Cl.² ............................ B23C 5/26; B23C 5/20
[52] U.S. Cl. .................................. 409/234; 409/232; 407/49; 407/52
[58] Field of Search .................. 407/35, 33, 40, 46, 407/30, 43, 52, 49; 90/11 A; 409/234, 232

[56] References Cited
U.S. PATENT DOCUMENTS

| | | | |
|---|---|---|---|
| 3,041,898 | 7/1962 | Better | 90/11 A |
| 3,077,025 | 2/1963 | Axer | 90/11 A |
| 3,091,138 | 5/1963 | Berry | 407/52 |
| 3,855,680 | 12/1974 | Wirefelt | 407/52 |
| 4,061,076 | 12/1977 | Robertson | 407/49 |

*Primary Examiner*—Leonidas Vlachos
*Attorney, Agent, or Firm*—Lawrence R. Burns

[57] ABSTRACT

A milling cutter is disclosed that comprises a rotatable adapter plate having a central protrusion on one side of the plate. A cutter ring, having recesses for mounting inserts therein, is provided with bayonet slots and a central opening so it can be fitted with and bolted to the adapter plate. The central protrusion is tapered and a conical grind is put on one of the mating surfaces between the adapter and the cutter plate to aid in disassembly after use of the milling cutter.

15 Claims, 4 Drawing Figures

MILLING CUTTER

BACKGROUND OF THE INVENTION

This invention relates to milling cutters and, more specifically, to composite type milling cutters that can be disassembled into two or more mating parts.

It is somewhat advantageous to fabricate milling cutters in two pieces by using a rotatable adapter plate coupled with a cutter ring. The adapter plate is fitted on a milling machine arbor and adapted to be driven in rotation while on the arbor.

The cutter ring is designed to be interchangeably fitted with the adapter plate and to carry cutting inserts on its outer periphery. Many different cutter rings may be coupled with a single adapter plate, making a variety of milling cutter designs available at a lesser expense than would otherwise be expected.

Generally, the composite type milling cutters described above are provided with a cylindrical central locating protrusion that extends from the adapter and closely mates with a central opening in the cutter ring. The adapter and cutter ring are then clamped together and the milling cutter is used to remove material such as metal from workpieces.

Often, the environment in which the milling cutter is used is contaminated, due to the material chips and dust and coolant fluid that becomes mixed during the cutting operations. As long as the milling cutter is used for one operation, no particular problems are encountered. However, when it is desired to change the cutter ring for a different operation, difficulties are encountered in uncoupling the plate and ring.

Usually, the cutter ring will be hard to remove from the cutter adapter because of the metal particles, chips, etc. that may have entered the close fit between the central opening and the protrusion. There is also a very close fit between the cylindrical protrusion and the opening, and it is very easy to bind the cutter ring on the adapter if each side is not moved evenly as it is taken apart.

It is an object of the present invention to provide a composite type milling cutter that is easy to disassemble after cutting operations.

It is a further object of the present invention to provide a simpler and more efficient milling cutter that has lightweight cutter rings that are easier to handle.

It is a further object of the present invention to reduce the risk of the cutter ring binding on the central protrusion of the cutter adapter when the milling cutter is being disassembled.

BRIEF SUMMARY OF THE INVENTION

According to the present invention, a milling cutter is comprised of a rotatable adapter plate having a tapered central protrusion. The protrusion is preferably cylindrical nearest the adapter plate but is provided with a taper near its distal end.

A cutter ring having a central opening for receiving the central protrusion is provided and recesses are formed, preferably in the outer periphery of the cutter ring for seating cutting inserts. One surface of the cutter ring and one surface of the adapter are abutted together and form cooperating surfaces of abutment. Clamping means are provided for clamping the ring to the adapter in a rigid, nonrotatable abutting relation with one another.

When the cutter assembly is in an assembled but unclamped position, one of the abutment surfaces on the ring and the adapter has formed thereon a portion that is concave when viewed from the other mating surface. When in an assembled and clamped position, the two surfaces are in forced substantially abutting contact with one another. Advantageously, the conical or concave portion acting between the two surfaces provides an upward lifting force on the cutter ring when the clamping means is released.

Preferably, the distal end of the central protrusion tapers inwardly and the innermost end of the central protrusion is cylindrical forming a close sliding fit with the central opening. The clamping means provided preferably comprises bayonet slots formed in one of the ring or the adapter with bolt means extending through the bayonet slots and threadedly connecting to the other of the ring and the adapter.

Preferably, cooperating elements of interlocking pin and groove means are used to hold the ring in relation with the adapter. The concave portion is preferably a one degree conical grind formed on either one or both of the abutting surfaces. The central protrusion and the central opening, of course, may be formed in either the ring and the adapter.

The exact nature of the present invention will become more clearly apparent upon reference to the following detailed specification taken in connection with the accompanying drawings in which:

DETAILED DESCRIPTION OF THE INVENTION

Figure 1:
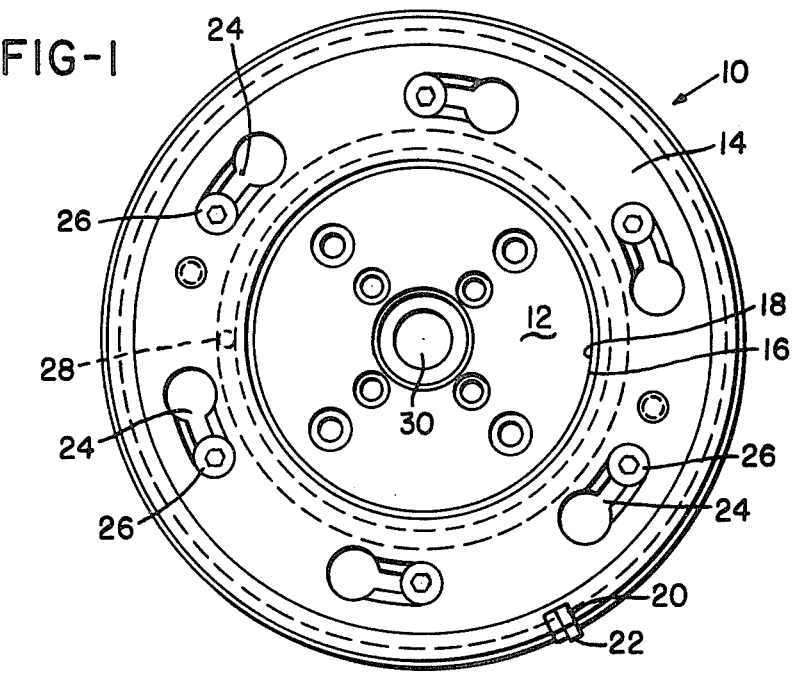
FIG. 1 is a top view of a milling cutter according to the present invention.

Referring to the drawings somewhat more in detail, shown in FIG. 1 is a composite milling cutter 10 which comprises a rotatable adapter plate 12 having a cutter ring 14 mounted thereon. The rotatable adapter plate has a central protrusion 16 that extends through a central opening 18 in the cutter ring.

The cutter ring is clamped on the adapter in a rigid, nonrotatable relationship and recesses 20 are formed on the outer periphery of the cutter ring 14 so that they may carry cutting inserts 22. Bayonet slots 24 are formed in the cutter ring and bolts 26 extend through the bayonet slots 24 and threadedly engage the cutter adapter 12. The central protrusion 16 is preferably tapered near the end that protrudes farthest from the cutter adapter.

Figure 2:
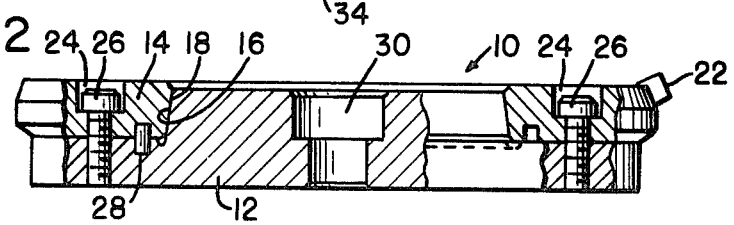
FIG. 2 is a cut-away side view of a composite milling cutter according to the present invention.

Shown in FIG. 2 is the milling cutter 10 having the cutter ring 14 mounted on the cutter adapter 12 and showing the tapering of central protrusion 16. Bolts 26 form a clamping means and extend through the bayonet slots 24 and threadedly engage the cutter adapter 12 thereby holding the cutter ring and cutter adapter in a rigid, nonrotatable relationship. An rib and groove means is shown typically, at 28, and this may preferably also be utilized to help locate the cutter ring 14 on cutter adapter 12.

Inserts 22 can be seen protruding from the periphery of the cutter ring 14. The entire milling cutter assembly 10 is, of course, adapted to be driven in rotation and is usually adapted in the center as at 30 to be clamped on a rotating arbor or the like.

Figure 3:
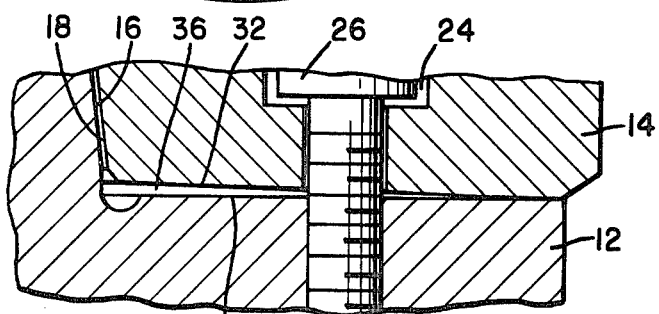
FIG. 3 is a fragmentary side cut-away of a milling cutter according to the present invention.

Shown in FIG. 3 is the cutter ring 14 sitting on the cutter adapter 12. Preferably, there are cooperating surfaces of abutment means between the cutter ring 14 and the cutter adapter 12. These cooperating surfaces of abutment are shown as at 32 and 34 and, preferably, one of the abutment surfaces 32 or 34 is concave when viewed from the other surface that it abuts against when milling cutter 10 is in unclamped position.

FIG. 3 shows surface 32 having a conical grind so that, in a released position, there is a clearance space 36 between the surfaces 32 and 34. The conical grind can go on either end or both of the surfaces 32 or 34 so that, when one is releasing the clamping means on the milling cutter, the cutter ring will have a tendency to automatically raise off the central protrusion 16. It has been found that this has great advantage in that the operator does not have to worry about the cutter ring becoming stuck on the central protrusion.

Figure 4:
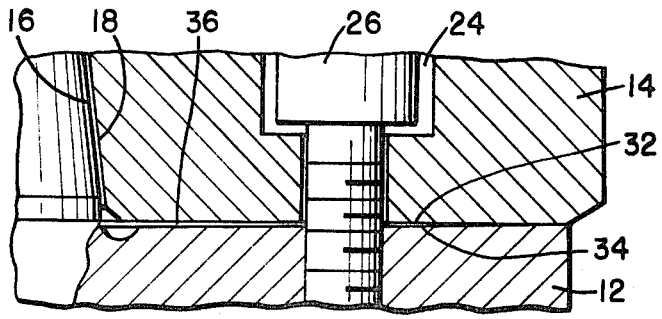
FIG. 4 is a fragmentary side cut-away of a milling cutter according to the present invention.

Shown in FIG. 4 is a drawing similar to what is shown in FIG. 3 only the surface 34 on the cutter adapter 12 has the conical grind that creates the opening 36 when the milling cutter is in an unclamped position.

Modifications may be made within the scope of the appended claims.

We claim:

1. A milling cutter comprising: a rotatable adapter plate having a central protrusion with a taper thereon; a cutter ring having a central opening for receiving said protrusion; recesses on said cutter ring for seating cutting inserts; cooperating surfaces of abutment means on said cutter ring and adapter; clamping means for clamping said ring and said adapter into rigid nonrotatable abutment with one another; and in an assembled but unclamped position, one of said abutment surfaces on said ring and said adapter having a concave portion when viewed from the other surface from said one surface.

2. A milling cutter according to claim 1 wherein actuation of said clamping means brings said concave portion into substantial abutting contact with said other surface from said one surface.

3. A milling cutter according to claim 2 wherein the outermost portion of said central protrusion tapers inwardly and the innermost portion of said central protrusion is cylindrical and forms a close sliding fit with a portion of said central opening.

4. A milling cutter according to claim 3 in which said clamping means comprises bayonet slots formed in one of said ring and adapter and bolt means extending through one of said ring and adapter and threadedly connecting to the other of said ring and adapter.

5. A milling cutter according to claim 4 which further includes cooperating elements of pin and groove means between said ring and adapter.

6. A milling cutter according to claim 4 in which said concave portion comprises a conical grind on said one surface.

7. A milling cutter according to claim 4 wherein said one surface comprises the abutment surface on said ring and the other surface comprises the abutment surface on said adapter.

8. A milling cutter according to claim 7 in which said clamping means comprises annularly spaced bayonet slots formed in said ring and extending through said concave portion and ball means extending through said ring and threadedly connecting to said adapter.

9. A milling cutter according to claim 8 in which said concave portion comprises a conical grind on said abutment surface on said ring.

10. A milling cutter according to claim 9 wherein said conical grind is a 1 degree conical grind.

11. A milling cutter according to claim 4 wherein said one surface comprises the abutment surface on said adapter and the other surface comprises the abutment surface on said ring.

12. A milling cutter according to claim 11 in which said clamping means comprises annularly spaced bayonet slots formed in said adapter and extending through said concave portion and bolt means extending through said adapter and threadedly connecting to said ring.

13. A milling cutter according to claim 12 in which said concave portion comprises a conical grind on said abutment surface on said adapter.

14. A milling cutter according to claim 13 in which said conical grind comprises a 1 degree conical grind.

15. A milling cutter comprising: a rotatable adapter plate having a central opening with a taper therein; a cutter ring having a central protrusion for extending into said opening; recesses on said cutter ring for seating cutting inserts; cooperating surfaces of abutment means on said cutter ring and adapter; clamping means for clamping said ring and said adapter into rigid nonrotatable abutment with one another; and in an assembled but unclamped position, one of said abutment surfaces on said ring and said adapter having a concave portion when viewed from the other surface from said one surface.

* * * * *